United States Patent [19]

Ziegler et al.

[11] Patent Number: 4,524,643
[45] Date of Patent: Jun. 25, 1985

[54] EPICYCLIC GEAR

[75] Inventors: Rolf Ziegler, Nusslock; Peter Hauk, Bonndorf, both of Fed. Rep. of Germany

[73] Assignee: Mavilor Systemes S.A., Switzerland

[21] Appl. No.: 455,498

[22] Filed: Jan. 4, 1983

[30] Foreign Application Priority Data

Jan. 18, 1982 [CH] Switzerland .............................. 271/82

[51] Int. Cl.³ .......................... F16H 1/28; F16H 55/18
[52] U.S. Cl. ........................................ 74/801; 74/409; 74/462; 74/785
[58] Field of Search ................. 74/785, 788, 801, 409, 74/460, 461, 462

[56] References Cited

U.S. PATENT DOCUMENTS

| | | | |
|---|---|---|---|
| 618,272 | 1/1899 | Johnson | 74/462 |
| 2,335,504 | 11/1943 | Gazda | 74/409 UX |
| 2,682,760 | 7/1954 | Shenk | 74/462 X |
| 3,315,546 | 4/1967 | Fritsch | 74/801 |
| 3,943,780 | 3/1976 | Klaue | 74/801 |

FOREIGN PATENT DOCUMENTS

| | | | |
|---|---|---|---|
| 72386 | 11/1943 | Czechoslovakia | 74/785 |
| 606634 | 12/1934 | Fed. Rep. of Germany | 74/801 |
| 2558093 | 6/1977 | Fed. Rep. of Germany | 74/409 |
| 580391 | 11/1977 | U.S.S.R. | 74/462 |

OTHER PUBLICATIONS

Shigley and Vicker, "Theory of Machines and Mechanisms", McGraw Hill, New York, 1980, pp. 297–300.

Primary Examiner—Allan D. Herrmann
Assistant Examiner—Arthur T. Quiray
Attorney, Agent, or Firm—Kane, Dalsimer, Kane, Sullivan and Kurucz

[57] ABSTRACT

The teeth of the sun pinion, planet wheels and hollow wheel have a profile correction changing continuously along the gear width and varying in opposite directions between the meshing gears. The sun pinion, hollow wheel and planet carrier are so mounted as to be fixed in the axial direction, whereas the planet wheels, allowed to slide individually in the axial direction on their stub shafts rigid with the planet carrier, are responsive to the axial force exerted by cup springs and mounted for swivel movement within predetermined limits on pendulum bearings. Furthermore, all the wheels, pinion and hollow wheel have crowned teeth. Due to their particular mounting, the planet wheels can swivel to a certain degree so that under the action of the cup springs even in case of tooth and assembly defects as well as in case of untrue running the teeth are constantly kept directly in their optimal meshing engagement, with the consequence that not only a substantially play-free gear operation but also a perfectly uniform load distribution in the gear are achieved.

4 Claims, 5 Drawing Figures

EPICYCLIC GEAR

BACKGROUND OF THE INVENTION

The present invention relates to an improved epicyclic or planetary gear comprising a sun pinion fixed to a first shaft rotatably mounted through bearings in the gear housing, a hollow wheel concentric with said sun pinion and at least two planet wheels meshing with said sun pinion and said hollow wheel, and interconnected by a planet carrier rotatably fixed to a second shaft coaxial to said first shaft.

An epicyclic gear of this type is already known through the West-German patent application No. DE-OS 25 58 093 depicting an epicyclic gear in which the planet carrier and its planet wheels are axially fixed whereas the sun pinion and the internally toothed annulus are axially movable and urged by an axially directed force, notably that of spring means. All wheels are provided with a profile correction changing continuously along the tooth width. Through the continuously changing profile correction of the spur teeth the wheels are allowed to slip axially in relation to one another until they mesh with each other substantially without any play, thus compensating the work tolerances. In addition, to obtain a load compensation or balance, the axially movable wheels are also movable radially within narrow limits. For this purpose, the sun pinion is adapted to be driven through a coupling sleeve formed at its two end portions with inner splines meshing on the one hand with corresponding outer splines formed on a stub shaft rigid with the sun pinion and on the other hand with corresponding outer splines formed likewise on the drive shaft. Disposed between this drive shaft and the stub shaft is a compression spring. With this bearing arrangement, the sun pinion is not only allowed to slide in relation to the drive shaft or the gear housing, but also to move radially, obviously on account of the very moderate resiliency of the coupling sleeve. In a similar manner, the annulus is provided with outer splines meshing with the inner splines of a special coupling sleeve meshing in turn with outer splines formed on an annular projection of the gear housing.

In this known epicyclic gear the sun pinion and the large, heavy annulus must unfavorably be mounted for both axial and radial movement by using special coupling sleeves provided with inner splines, so that a rather complicated construction is obtained. Furthermore, it is more difficult to achieve the desired self-adjustment due to the fact that the heavy mass of the annulus must be capable of moving axially and/or radially, that is, on the whole, in a rapid periodic sequence depending on the rotational speed of the planet wheels. The therefore necessary periodic accelerations of a relatively heavy inert load are a source of undesired losses and stresses, and may eventually lead to detrimental vibrations.

In addition, two further power transmissions through teeth or splines are introduced, and it is necessary to take due account of, and possibly eliminate, the play developing therein, if it is desired not to interfere with the free working play to be obtained through the continuously changing profile correction of the teeth of the sun pinion, planet wheels and annulus. Furthermore, it is scarcely possible to compensate an untrue running of this known gear construction. It is also notoriously precluded, in the present state of the art, to attain the desired perfect load balance, since the distance between the planet wheels or the radial positions of all the planet wheels have fixed values that cannot be changed. For these various reasons, epicyclic gears of the type mentioned above have not been used in actual practice so far.

Epicyclic gears with bevel wheels and pinions are also known in the art (cf. West German Pat. No. DE-OS 2 363 106), wherein the planet wheels are resiliently urged in the axial direction and rotatably supported by the planet-carrier stud shafts. With this method and by using normal working tolerances it is possible to obtain a torque distribution. The radially rigid planet wheels are provided in this case with two opposed sets of bevel teeth, thus obviously increasing the manufacturing cost and the axial dimensions of the gear.

On the other hand, epicyclic gears are known wherein, for obtaining the best possible load balance, the planet wheels are mounted on spherical or pendulum bearings (cf. West-German patent application No. DE-PS 503 307 and U.S. Pat. No. 3,178,966).

Notwithstanding the multiplicity of known epicyclic gears which, on account of their space-saving and compact construction, their coaxially arranged driving and driven shaft and the multiple possibilities of changing their reduction ratios in a simple way, up to now one had to renounce their application whenever a substantially play-free power transmission was required. This applies before all to actuators, more particularly to follower controls and the like, in which an absolutely accurate positioning is a must, as for example in handling and manipulating machines and apparatus, especially for driving industrial robots, and also for the digital control of precision machine tools, the position control of astronomical observation instruments, and the like. In such cases, even a lateral play of only a few arc minutes may already lead to unacceptable bearing defects. Consequently, up to now for such applications special gears having little or no play at all and consistent with each specific use were used, but this proved to be an expensive and awkward solution, as for example the cycloid disk gear, the special spur-gear with precision-selected wheels, the spur-gear with torsion bracing or the like. The last-named gear construction is also objectionable in that, on account of the torsion bracing, its resiliency is exerted in the circumferential direction, whereby mainly during strong accelerations and quick changes in the direction of rotation unacceptable vibrations are most likely to develop.

SUMMARY OF THE INVENTION

It is the primary object of the present invention to provide an epicyclic gear so constructed that, by using a simple manufacturing means and without resorting to any precision machining techniques, on the one hand the backlash between mechanical side faces or between meshing teeth is substantially avoided, and on the other hand any untrue running, are compensated automatically, and that even in case of relatively large teeth cutting tolerances the best possible meshing engagement is constantly and simultaneously maintained between the planet wheels, the sun pinion and the hollow wheel, thus warranting a uniform and constant distribution of the load and torque to be transmitted through the gear.

For this purpose, planet wheels according to the present invention are on the one hand movable separately and independently of one another in the axial direction and biased in said axial direction by a pressure member, notably a cup spring assembly, exerting a resilient axial force and disposed between said wheels and the planet carrier, and on the other hand allowed to move radially on their planet-wheel stub shafts by being oscillatably mounted on pendulum bearings, all the wheels comprising crowned teeth, the sun pinion and the planet carrier being axially fixed to their shafts.

Thus the new gear is of particularly simple and sturdy construction. All the wheels and pinions can be machined by using conventional generating milling cutters and machine tools, and do not require a high degree of machining precision. More particularly, no precision-ground wheels are necessary. This simple manufacture, in combination with simple assembly steps, are in favor of a very budget-priced production, so that for the first time relatively cheap, substantially play-free epicyclic gears having a lateral backlash of less than one arc minute and a substantially perfect load balance, are made available and which, in practical applications requiring a very high degree of precision in the positioning of parts, can be substituted for the hitherto necessary, very expensive special gears mentioned in the foregoing.

If the planet wheels were prestressed only in the axial direction, without being subsequently bent in the radial direction, in case of inaccurate orientation of the gear wheels or of untrue running, they would momentarily be in firm meshing engagement with one or the other planet wheel, sun pinion or annulus, while the meshing engagement with the other wheel would be more or less loose or slack, with the consequence that play would develop between the sun pinion and the annulus. If on the other hand the planet wheels were mounted only in pendulum bearing without any possibility of moving in the axial direction, in case of reversal they might become locked.

According to the present invention, it is only when each planet wheel is set independently and axially, and adapted, by virtue of its mounting in a pendulum bearing, to oscillate within predetermined limits about an axis perpendicular to the planet-wheel axis, and further comprises crowned teeth, that is, tooth faces rounded in the axial direction, that all the planet wheels, as a consequence of the above-mentioned degree of free play or backlash, when subjected to a properly selected axial working force, can mesh so deeply and firmly with the teeth of the sun pinion and annulus that a substantially perfect backlash develops automatically and continuously. Consequently, fabrication or machining tolerances, tooth defects and inaccuracies which may arise primarily on account of distortions or a faulty concentricity of the external annulus, are compensated automatically. Since each planet wheel is compulsorily kept in perfect meshing engagement with the teeth of the sun pinion and annulus, a precise load compensation or balance is also safely obtained. The mean radius and degree of crowning of the sets of teeth are so selected that the contact point between cooperating tooth faces lies at least approximately in the middle of the tooth width. Due to the crowning of the gear teeth it is unnecessary to accurately orient the wheels in the axial direction, and the so-called "edge rolling" is eliminated.

In order to improve the flexibility of the tooth meshing engagement, especially at high r.p.m. values, and to accelerate the compensation movement of the planet wheels under the influence of instantaneous unequal forces, it may be advantageous to provide the teeth of the planet wheels and/or of the sun pinion and/or of the annulus with radial slits for the purpose of increasing the tooth resiliency.

The cone angle of the cone enveloping the tooth tips of all gear teeth has preferably a value in the range of 6° to 15°, and preferably 10°.

Also preferably, the wheels of the epicyclic gears according to the present invention have involute teeth.

THE DRAWINGS

DESCRIPTION OF THE PREFERRED EMBODIMENTS

Figure 1:
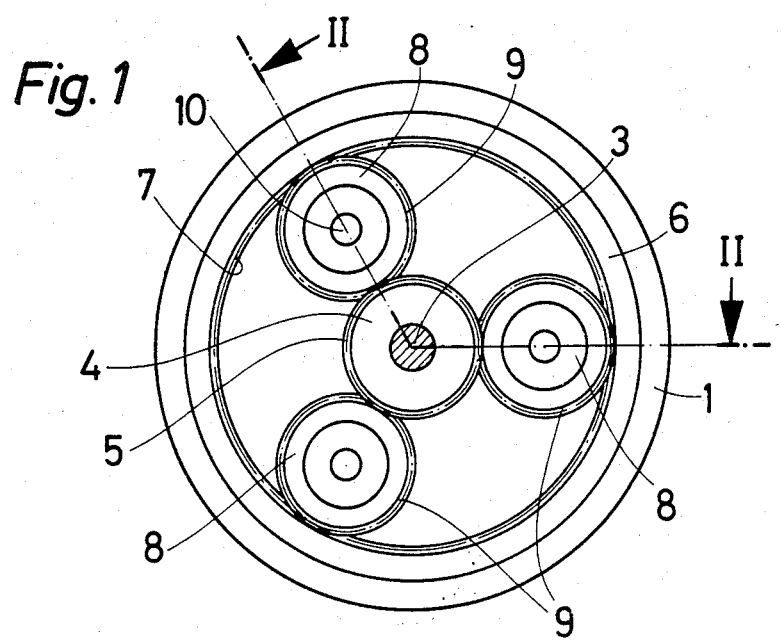
FIG. 1 is a diagrammatic side elevational view of an epicyclic gear according to the present invention, which comprises three planet wheels.
Figure 2:
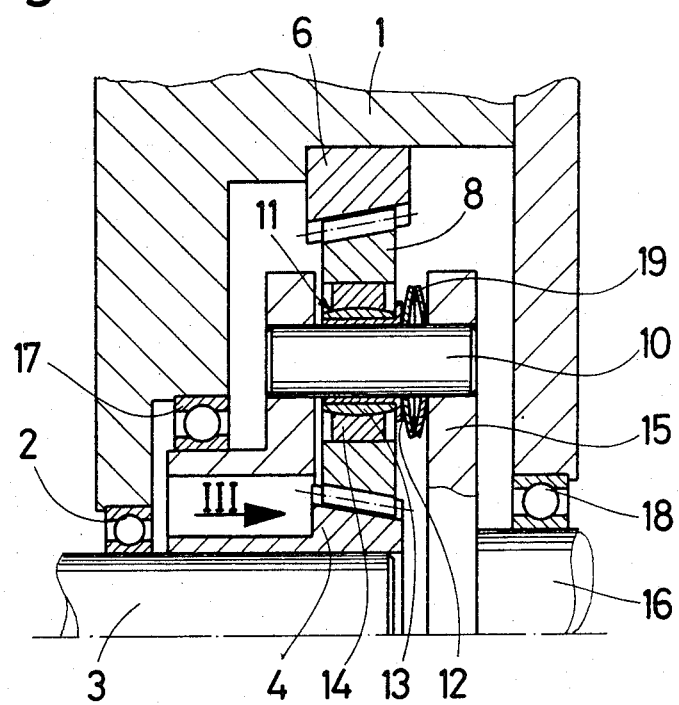
FIG. 2 is a section taken on a larger scale along the line II—II of FIG. 1.

As shown in FIGS. 1 and 2 of the drawings, a first shaft 3 held against axial movement is rotatably mounted by means of a ball-bearing 2 in the housing 1 of the epicyclic gear. The sun pinion 4 provided with teeth 5 is fixed to this shaft 3. Finally, an annulus 6 or hollow wheel provided with internal teeth 7 is rigidly fitted in the housing 1 concentrically to the first shaft 3. Between the sun pinion 4 and the annulus 6, three planet wheels 8 are disposed at spaced angular intervals, as shown in FIG. 1, and mesh on the one hand with sun wheel 8 and on the other hand with annulus 6. Each planet wheel 8 is axially movable and mounted on a pendulum bearing 11 permitting its oscillation within predetermined limits on the corresponding planet-wheel stub shaft 10. All the planet wheel stub shafts 10 are carried by a common planet-wheel carrier 15 to which a second shaft 16 coaxial to the first shaft 3 is secured. This planet carrier 15 and its shaft 16 are held against axial movement and rotatably mounted in the gear housing 1 through the pair of ball-bearing 17 and 18.

The above depicted epicyclic gear consists preferably of a reduction gear coupled directly to a motor operator; therefore, the shaft 3 is the drive shaft and consequently the motor shaft, or an input shaft coupled to the motor shaft, whereas the shaft 16 coaxial thereto constitutes the output shaft. With an epicyclic gear of this character is it possible to select a desired reduction ratio among a wide range of reduction ratios, especially a relatively small reduction ratio, a feature unattainable or attainable only by resorting to complicated and costly arrangements with epicyclic gears having little or no free play according to hitherto conventional constructions.

In the example so far discussed the pendulum bearing 11 consists of an inner bearing sleeve 12 mounted for axial movement and free rotation on the corresponding planet-wheel stub shaft 10, a part spherical convex bearing ring 13 fitted on sleeve 12 and adapted to act as the ball member of a ball-and-socket joint, and an outer bearing ring 14 which carries the planet wheel proper 8 and has a concave inner surface corresponding to the outer convex surface of ring 13, the two surfaces being a slide fit to each other. Thus, the outer ring 14 slides like the socket of a ball-and-socket joint on the part-spherical ring 13 and can oscillate in relation thereto within predetermined limits so that also the planet wheel 8 can oscillate within predetermined angular limits about an axis extending at right angles to the axis of sub shaft 10.

The sun pinion 4, planet wheels 8 and annulus 6 are spur gears and have involute teeth with a continuously changing profile correction along the tooth width, which in the case of sun pinion 4 and annulus 6 changes from positive correction on the input or driven side to a negative correction on the output or driving side of the wheels, and, in the case of planet wheels 8, varies in the reverse direction. Thus, the sum of the profile corrections of the two meshing wheels, under consideration of the reference marks at each contact point throughout the tooth width, has constantly the same value. Therefore, the apex of the cone formed by the tooth-tip lines of sun pinion 4 lies on the driving side as seen in FIG. 2, whereas the corresponding cone apex lines of planet wheels 8 and annulus 6 lie on the driven side. The cone angle preferably ranges from a minimum value of $\theta$ equal 6° to a maximum value of $\theta$ equal 15°, and is preferably about 10°. In the case of a cone angle of less than about 6°, self-locking or jamming is likely to occur, for the planet wheels 8 are no more under the influence of an inwardly-directed radial force exerted on these wheels, which might be generated for example as a consequence of a lack of concentricity, so that they are subjected to an axial alternating motion directed to the right, as seen in FIG. 2, that is, towards the driving side.

The general principle of providing a tooth profile correction changing continuously along the tooth width in a toothed wheelwork as well as the advantages resulting therefrom, are known notably through the West German Pat. No. DE-OS 2 446 172. These gears have at first sight the appearance of bevel gears, since the tooth-tip and tooth-root lines extend along conical surface. However, they actually are spur wheels having their geometry based on a base cylinder and consequently a constant module throughout the tooth width. These gears can be manufactured more easily and at a lower cost than bevel gears by machining them on conventional spur-gear milling cutters, according to the customary spur-gear automatic hob milling process, wherein the tool, during the milling of a tool profile, is guided along a curved path corresponding to the base cylinder.

Disposed between each planet wheel 8 and the portion of planet carrier 15 which lies on the divergent side of the planet wheel cone is a resilient pressure member 19 in the form of a cup spring or an assembly of spring washers supported by the planet-wheel stub shaft 10. Each resilient pressure member 19, bearing against a collar-shaped portion of bearing sleeve 12, constantly urges the corresponding planet wheel 8 with a predetermined axial force in such a way that the planet wheel eventually meshes home, therefore without any play, with the teeth 5 and 7 of sun pinion 4 and annulus 6, respectively, whereby the pendular suspension arrangement permits the individual self-adjustment of each planet wheel 8.

Figure 3:
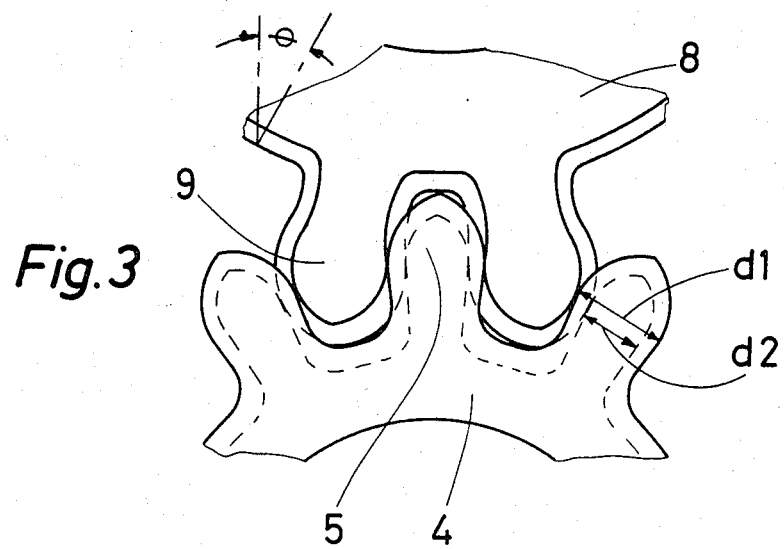
FIG. 3 is a fragmentary view showing cooperating teeth of an epicyclic gear, the view being taken in the direction of the arrow III of FIG. 2.

A variable profile correction is illustrated diagrammatically in a specific case in FIG. 2, showing in fragmentary elevational view taken in the direction of the arrow III of FIG. 2 the meshing teeth 5 and 9 of sun pinion 4 and one of the planet wheels 8. In this view, the cross-sectional contour of the teeth are shown in thick lines on the driven side and in broken lines on the driving side. Therefore, the cross-sectional profile of the teeth of sun pinion 5, which is relatively thick on the driven side, narrows from the teeth thickness d1, with the simultaneous decrement in the tooth profile, down to the tooth thickness d2 on the driving side. The narrowing and profile changes of the teeth of the planet wheels 9 take place in the opposite direction. Thus, the cross-sectional profile on the narrower side of the teeth may be somewhat recessed, as shown in FIG. 3.

Figure 4:
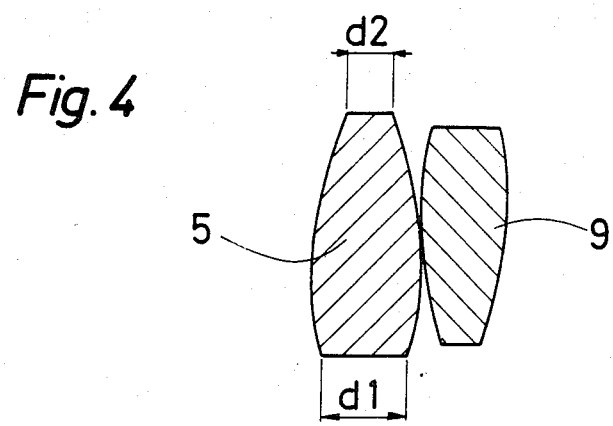
FIG. 4 is a diagrammatic plane view from above of the front faces of two cooperating teeth of a sun pinion and a planet wheels.

In addition, the teeth of all the gears are crowned, as illustrated diagrammatically in FIG. 4, which is a plane view from above of the front faces of two mutually engaged teeth, i.e. one tooth 5 of sun pinion 4 and one tooth 9 of a planet wheel 8. In a manner known per se, the gear faces have a part-spherical convexity in the tooth-width direction, or in other words the tooth faces are convex or bulged, so that the exact meshing is totally insensitive to minor tooth and assembly defects, and any edge-rolling is safely avoided. FIG. 4 also shows the thicknesses d1 and d2 of the teeth 5 and 9 of planet wheels 4 and 8, respectively, already shown in FIG. 3, on the input and output sides of the gears.

The above-described form of embodiment of the epicyclic gear of the present invention, which can be manufactured economically by using conventional machine tools, for example ordinary milling cutters, imparts to the planet wheels, by virtues of the axially fixed planet carrier annulus and sun pinion, a certain degree of free orientation such that the gears are compulsorily kept in proper meshing engagement, even in case of tooth and assembly defects and in case of untrue running, thus warranting a substantially complete absence of play and a practically absolute uniform load distribution. In addition, planet wheels have generally a smaller mass than the annulus, thus facilitating of course their self-adjustment.

In a typical epicyclic gear according to this invention, which can be incorporated as a reduction gearing directly in a 4 to 6 kW motor operator having a rotational speed of 3,000 r.p.m., the diameter of the inner teeth 7 of annulus 6 may be for example 135 mm, and the diameter of the sun pinion 4 and of the three planet wheels 8 has substantially the same magnitude. Assuming a power output of 13 to 14 Nm, the resilient force of cup springs 19 may amount to about 1 kg, and the cone angle of all the wheels of the epicyclic gear may be about 10°. The backlash measured on an epicyclic gear of this type is estimated to be less than one arc minute.

Figure 5:
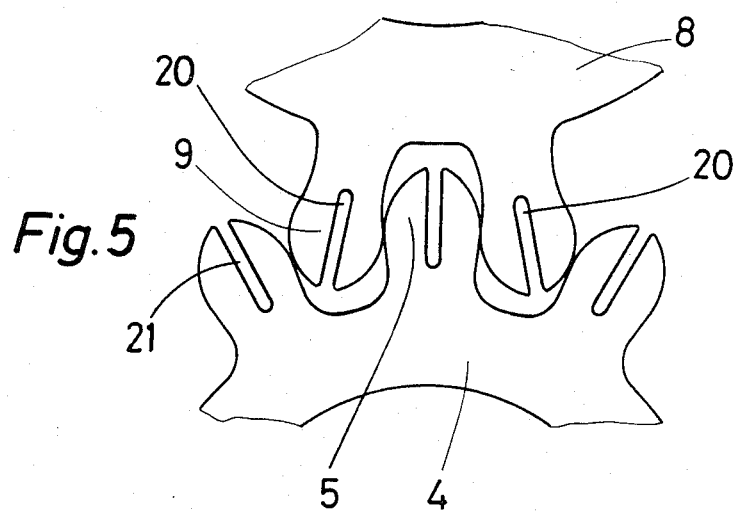
FIG. 5 is a modified form of embodiment showing radially slit teeth of a planet wheel and a sun pinion.

In certain cases, especially for an epicyclic gear to be operated at high rotational speeds, it may prove advantageous to provide the teeth of the planet wheels and/or of the sun pinion and/or of the annulus with radial slits opening at the tip of the teeth, so as to either impart a certain resiliency to the tooth portions separated by this slit or improve the tooth resiliency. In the diagrammatic example shown in FIG. 5 corresponding otherwise to FIG. 3, the teeth 9 of planet wheel 8 comprise central radial slits 21 and the teeth 5 of sun pinion 4 comprise similar slits 20. The elastic flexibility thus obtained or improved facilitates and accelerates the quick automatic axial and/or radial compensation movements of planet wheels 8 under the momentary influence of spurious and changing forces developing as a consequence of machinine tolerances and inaccurate wheel orientation.

The above-mentioned degree of freedom of the planet wheels 8 will thus be further enhanced by the additional degree of freedom resulting from a moderate elastic deformability of the split toot sections, so that also at high rotational speeds an optimal tooth meshing engagement will be facilitated.

The invention should not be construed as being strictly limited by the specific form of embodiment shown and described herein, since many modifications and changes may be brought thereto without departing from the basic principles of the invention. Thus, notably, the pendulum-bearing design may also, if desired, incorporate spherical race bearings, and the type of resilient pressure members associated with the planet wheels, and also the number of these planet wheels, may be changed to suit specific requirements.

What is claimed is:

1. An epicyclic gear comprising a sun pinion axially fixed to a first shaft rotatably mounted through bearings in a gear housing, a hollow wheel having internal teeth concentric with said sun pinion and being fixed to the gear housing, and at least two planet wheels meshing with said sun pinion and said hollow wheel, and interconnected by a planet carrier rotatably fixed to a second shaft coaxial with said first shaft, wherein spur teeth are located on all of the wheels and are provided with a profile correction changing continuously along a width portion of each tooth and in each couple of meshing wheels this correction changes in opposite directions along the tooth width, the planet wheels being on the one hand movable separately and independently of one another in an axial direction and biased in said axial direction by a spring means exerting a resilient axial force and disposed between said wheels and the planet carrier, and on the other hand allowed to move radially on a planet-wheel stub shaft associated with each planet wheel, which connects the planet wheel to the planet carrier, by being oscillatably mounted on pendulum bearings, which allow radial movement, yet maintain the axis immovably fixed to the planet carrier and parallel to the other axes, all the wheels comprising crowned teeth, the sun pinion and the planet carrier being axially fixed to their shafts, the planet carrier being non-tiltable.

2. The epicyclic gear of claim 1, wherein said pendulum bearings consist each of a bearing sleeve adapted to slide axially on the associated planet wheel stub shaft, of a convex part-spherical bearing ring fitted on said sleeve and an outer bearing ring formed with a part-spherical inner surface corresponding to said convex part-spherical bearing ring.

3. The epicyclic gear of claim 1, wherein the teeth of at least one of said planet wheels, said sun pinion, and said hollow wheel are each provided with a radially directed slit in order to improve their inherent resiliency.

4. The epicyclic gear of claim 1, wherein a cone angle of a cone enveloping tooth tips associated with all the wheels, pinion and hollow wheel has a value within the range of 6° to 15°.

* * * * *